United States Patent
Chapman

(10) Patent No.: US 8,767,421 B2
(45) Date of Patent: Jul. 1, 2014

(54) POWER CONVERTER BUS CONTROL METHOD, SYSTEM, AND ARTICLE OF MANUFACTURE

(75) Inventor: Patrick L. Chapman, Austin, TX (US)

(73) Assignee: SolarBridge Technologies, Inc., Austin, TX (US)

( * ) Notice: Subject to any disclaimer, the term of this patent is extended or adjusted under 35 U.S.C. 154(b) by 190 days.

(21) Appl. No.: 13/162,532

(22) Filed: Jun. 16, 2011

(65) Prior Publication Data

US 2012/0320641 A1 Dec. 20, 2012

(51) Int. Cl.
*H02M 1/12* (2006.01)
*H02M 1/14* (2006.01)

(52) U.S. Cl.
USPC ............. 363/39; 363/35; 363/40; 363/95; 363/98; 363/131; 363/132

(58) Field of Classification Search
USPC ............. 363/35, 39, 40, 95, 98, 131, 132
See application file for complete search history.

(56) References Cited

U.S. PATENT DOCUMENTS

| | | | |
|---|---|---|---|
| 5,801,519 A | 9/1998 | Midya | |
| 7,164,590 B2 * | 1/2007 | Li et al. | 363/40 |
| 7,755,916 B2 | 7/2010 | Krein et al. | |
| 2007/0030706 A1 * | 2/2007 | Wei et al. | 363/44 |
| 2007/0030707 A1 * | 2/2007 | Wei et al. | 363/44 |
| 2007/0030708 A1 * | 2/2007 | Wei et al. | 363/44 |
| 2008/0183338 A1 | 7/2008 | Kimball et al. | |
| 2009/0097283 A1 | 4/2009 | Krein et al. | |
| 2009/0244937 A1 * | 10/2009 | Liu | 363/46 |
| 2011/0026281 A1 | 2/2011 | Chapman et al. | |
| 2011/0026282 A1 | 2/2011 | Chapman et al. | |
| 2011/0062935 A1 | 3/2011 | Gray et al. | |

OTHER PUBLICATIONS

T.K.A. Brekken, Utility-Connected Power Converter for Maximizing Power Transfer From a Photovoltaic Source, A Thesis Submitted to the Faculty of the Graduate School of the University of Minnesota, In Partial Fulfillment of the Requirements for the Degree of Master of Science, Jun. 2002.
Schmidt, et al, Control of an Optimized Converter for Modular Solar Power Generation, Swiss Federal Institute of Technology, Power Electronics & Electrometrology Laboratory, Zurich, Switzerland 0-7803-1328-3/94$03.00C 1994 IEEE, pp. 479-484.
Chapman, et al., AC Modules and Solar Power Electronics, www.Solarbridgetech.com, Oct. 8, 2010.
Chapman, et al., Safety Advantages of AC-Module Systems for Solar Power, www.Solarbridgetech.com, Oct. 8, 2010.
Solarbridge Management System, www.Solarbridgetech.com, 2010.
SolarBridge Pantheon(TM) MicroInverter, www.Solarbridgetech.com, 2010.
The SolarBridge Solution Simply More Reliable AC Solar, www.Solarbridgetech.com, 2010.

* cited by examiner

*Primary Examiner* — Bao Q Vu
(74) *Attorney, Agent, or Firm* — Grasso PLLC; Fred Grasso

(57) ABSTRACT

Processes, machines, and articles of manufacture that may management power conversion as provided. This may include circuit topology or management that serves to improve power conversion efficiency from a DC waveform to an AC waveform. This circuit topology or management may include considering and managing the voltage across a DC-link capacitive bus and the phase angle output of an AC waveform in order to influence or improve power conversion characteristics or efficiency.

20 Claims, 8 Drawing Sheets

1310 – Determine Normalized Capacitance by Considering Peak Voltage, Peak Current, Bus Capacitance, and Grid Frequency

1320 – Determine Ideal Bus Voltage for lowest practical voltage that also maximizes efficiency by Considering Normalized Capacitance, Phase Angle, Voltage, Grid Frequency, and Apparent Power

1330 – Modify ideal bus voltage boundary with safety factor

1340 - Use Determined Ideal Bus Voltage (with or without safety factor) With Phase Angle to Manage Operation of Converter Circuit

FIG. 13

POWER CONVERTER BUS CONTROL METHOD, SYSTEM, AND ARTICLE OF MANUFACTURE

BACKGROUND

The present invention relates to power converter control, and more specifically to processes, machines, and manufactures, directed to managing, adjusting, or otherwise influencing power converter bus voltages or currents and AC output waveforms.

The relationship between AC voltages and currents is load dependent. When there is no shift in waveform timing between an AC voltage and the related AC current the phase shift is said to be zero. When there is a shift in waveform timing between an AC voltage and the related AC current the phase shift can be represented in terms of positive or negative degrees where the degrees are indicative of the amount of difference in timing.

When no system phase shift is measured, e.g., a 0° system phase shift, it is as if the current is passing through a simple resistor and the system is said to be at a unity power factor. When a phase shift other than 0° is measured, there is a shift in waveform timing between the voltage and related current. This shift in waveform timing is indicative of a "leading" or "lagging" relationship and is as if the current is passing through a capacitor or inductor. The degree of phase shift relates to the amount of real and reactive power that flows and these leading and lagging effects serve to affect how much generated power needs to be sent to a load to power it. Simply stated, phase angle of an AC waveform refers to the amount of lag or lead between the voltage and current of that AC waveform.

Phase angle may be a design consideration of power converters that act to convert power from one state to another. This conversion may include stepping up voltages from a DC input to a DC output, converting DC power to AC power and modifying AC waveforms. These conversions may be performed in stages, where an input DC voltage is stepped up to a higher voltage in a first stage, converted to an AC waveform in a second stage, and further modified into a different AC waveform in a third stage. Converters may partially or fully isolate these stages from one another to minimize the risk of damage from spikes or other electrical transients. The stages may be isolated, at least in part, through the use of capacitive buses positioned in parallel between the stages. Other isolation techniques may be used as well.

Power inverters may be used to convert DC from a relatively low voltage or low power DC source into an AC waveform for use on the public power grid. In so doing, power from the DC source may be applied to the AC grid for use apart from the DC source and the operator of the DC power source may be compensated for power contributions to the grid.

Phase angle of an AC waveform may be considered when determining how much work can be powered by the waveform. Power factor considers the real and reactive power available to a load being driven by an AC power system. Real (or active) power is consumed by the load in order to perform work. Reactive power, comparatively, reciprocates in the circuit and is ultimately returned to the AC power source.

Reactive power is not available for other loads when it is reciprocating in the circuit. As a result high reactive power reciprocation is not favored. Reactive power reciprocation may be created by LC circuits and RC circuits that disturb the phase relationship of voltage and current. The characteristics of a non-linear load may also act to distort the waveform of an AC power form, thereby distorting the signal and resulting in additional power being drawn and subsequently released. Other circuit properties may impose reactive power inefficiencies as well.

Power factor is measured as a unitless ratio from between zero and one, with active power being divided by apparent power. When a large amount of reactive power relative to real power consumed is received, reciprocates, and is later released back to the power grid, the power factor may be considered to be low. Conversely, when a small amount of reactive power relative to real power consumed is received, reciprocates, and is later released back to the power grid the power factor may be considered to be high. The closer the power factor of a circuit is to one, the less additional power need be supplied to the circuit as loads are driven by the circuit. The further the power factor of a circuit is from one, the more cumulative real and reactive power need to be supplied to the circuit. This increased reactive power is disfavored as the reactive power is unavailable for other uses when it is reciprocating in the circuit. Also, the reciprocating reactive power can contribute to current losses from heat or other imperfections in the circuit.

When no energy is stored in a load and the resistance of the load is linear, the relationship between current and voltage will be in step so the power factor will be one. Comparatively, when the load stores energy that is returned to the source or the load is nonlinear, the apparent power delivered by the source will be greater than the current used for powering the load so the power factor will be less than one.

In sum, power factor may be considered to be a dimensionless ratio that varies from zero to one, may be expressed as a percentage, and may be numerically reflected by (a) the ability of the circuit to perform work at a given time (b) divided by the RMS voltage×RMS current of the circuit. A power factor of zero indicates that the energy flow is entirely reactive. Comparatively, when the power factor is one there is no reactive power in the circuit.

Power factor may also provide for computation of known relationships in certain waveforms. For example, when the power waveform is a perfect sinusoid, the sum of the squares of the reactive power (Q) and the real power (P) may be equal to the square of the apparent power (S).

$$Q^2 + P^2 = S^2 \tag{1.1}$$

And, the absolute value of the cosine of the angle ($\phi$) of difference between the current and voltage may be multiplied by the apparent power to determine the real power (P).

$$|P| = |S||\cos \phi| \tag{1.2}$$

Embodiments provided herein are directed to, among other things, processes, machines, and manufactures, regarding converter bus regulation or control and AC waveform phase angle control. The regulation of bus voltages or current and the monitoring, consideration, adjustment, detection, or management of power and power factor for power converters may be included. Other embodiments are plausible as well.

BRIEF SUMMARY

Related power bus control and phase management of AC waveforms is provided herein. Embodiments may include processes, machines, and articles of manufacture. These and other embodiments may serve to provide for or enable selective control over power conversion. This power conversion control may include setting or maintaining voltages or other parameters of a DC-link capacitor bus such that a power source may provide preferred power waveforms and levels.

This power control may also include setting or maintaining AC phase angles such that preferred power factor levels are provided or maintained for a power source. In embodiments, for example, an inverter receiving DC voltage from one or more photovoltaics, and providing AC waveforms to a power grid network, may be controlled or managed to provide improved or targeted performance.

Embodiments may include a Bus Voltage Command Calculator (BVCC) that can function to regulate bus voltage or bus current. The BVCC may be used with a Max Power Point Tracker (MPPT) that serves to regulate input voltage or current from a DC power source. The BVCC and the MPPT may be used together or independently and may function to manage, optimize, or otherwise control power converter production and output waveforms. These power converters may include inverters such as those used with photovoltaic cells, wind turbines, and other DC power sources. The BVCC may function with the MPPT by using control loops that regulate bus voltage and input current (or voltage in some cases). This regulation may serve to lower the DC bus voltage while also providing a net capacitive load to the grid. Still further, in embodiments, the capacitive benefit may be selectable by the user of the inverter and/or the utility grid operator.

Embodiments may employ real-time calculations as well as curve matching and empirical testing to determine commanded bus voltages for operating an inverter or other device. In embodiments, the commanded bus voltage may be maintained to keep the bus voltage from dropping below the absolute value of the grid voltage or below a threshold set by a DC-DC stage. In embodiments, the phase shift φ of the output current waveform may also be varied and controlled using mathematical formulas, empirical testing, and curve matching techniques. The combined management of phase shift and minimum or targeted bus voltages may serve to improve power output efficiencies of the inverter.

In embodiments, bus voltage $u_c$, whose squared value $u_c^2$ has a constant $K_F$ and ripple component $F(t)$, may be used with additional controls to select the lowest practical bus voltage to maximize efficiency. This may be accomplished in conjunction with varying the power factor of the inverter, by varying the angle φ of the output current. The angle φ may be varied by measuring and considering in a BVCC or elsewhere: power, grid voltage, and whether or not a phase shift is permitted, and converting these to a bus voltage command that optimizes efficiency.

Embodiments may be implemented in circuit-layout design, portable media, storage media, firmware, computer executed code, specialty programmed computers, and combinations thereof. Still further embodiments and combinations may also be implemented.

BRIEF DESCRIPTION OF THE SEVERAL VIEWS OF THE DRAWINGS

FIG. 13 shows features of a process for capacitive bus control as may be employed in accord with embodiments of the invention.

DETAILED DESCRIPTION

Figure 1:
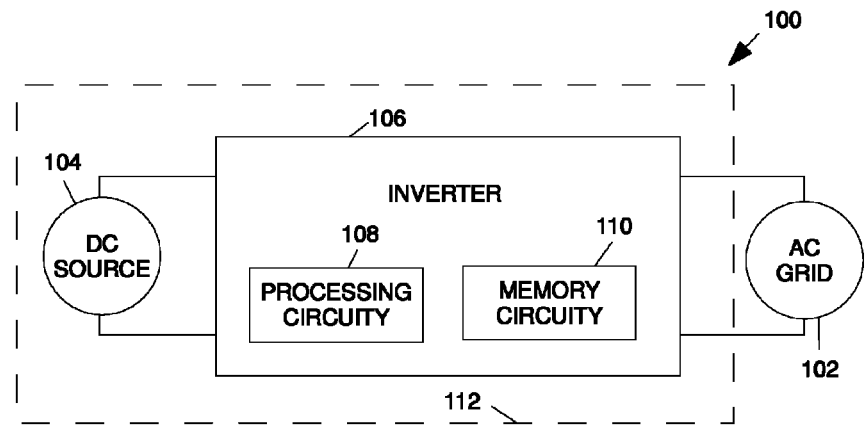
FIG. 1 shows general circuit topology of a power conversion system as may be employed in accord with embodiments of the invention.

Selective control of DC and AC waveforms is provided herein. This control may be implemented in power converters, including power inverters and microinverters, and may include managing power point settings for a DC power source as well as managing DC-link bus voltages. This control may serve to modify or improve power waveforms distributed by the power converter to the public power grid or other source. The selective control may be employed in other ways and for other reasons as well.

In embodiments, the selective control of DC-link buses and DC power sources may be carried out with real-time calculations as well as with calculations made beforehand, stored, and later retrieved through the use of a look up table. Whether calculated in real-time or otherwise, phase angle settings and preferred bus voltage minimums may be considered to provide peak or improved power performance for converters or other devices employing the invention. Still further, in embodiments, selected bus voltage minimums may be further adjusted and may account for a factor of safety or an adjustment that accommodates circuit impurities or inefficiencies.

Embodiments may be employed in two-stage inverter architectures, which consist of a DC-DC input stage, and a DC-AC output stage. Other architectures may be used in embodiments as well. In embodiments the inverter stages may be connected by a DC bus or DC link that includes a capacitor or other filtering or isolating topology. This bus or link may be controlled or managed in embodiments such that the applicable design limits of the capacitor may be relatively small. Relatively small DC bus capacitance sizes may be preferred as this can support designs with preferred capacitor reliability and designs with smaller design range tolerances for operation.

Embodiments may also provide control of voltage of the DC bus to influence power output, power factor properties of the converter, or both. In so doing embodiments may provide improvements in the power output and efficiency of the converters as well as serve to provide additional capacitive or inductive load to the power grid. An example of such an embodiment may include power inverters that serve to convert DC power generated by an alternative energy source, such as in a photovoltaic power system, to a single-phase AC waveform power for delivery to the public power grid at that grid's grid frequency.

Still further, in embodiments, voltage ripple associated with the mains power grid frequency may be considered, adjusted for, or managed when determining a desired bus voltage or phase angle output. The voltage ripple may be accounted for such that the voltage ripple provides little or no interference with an inverter's ability to deliver clean sine wave current to a mains power grid. Embodiments may also provide for voltage ripple accommodation that serves to avoid or adjust for voltage minimums. For example, embodiments may provide protections against having voltage drops reach below minimum thresholds in the DC-DC stage converter of an inverter. These voltage drops may not be preferred as they can serve to prevent a converter from functioning properly, at all, or within acceptable ranges.

As noted, embodiments may provide a net capacitive or inductive load to the mains power grid. This net capacitive or inductive load may be selectable and may be selected by the user, the grid operator, or another. This selection of the cumulative circuit load, which is preferably a capacitive load, may occur at various times including start-up, run-time, and on a varying or as-desired basis. This selection may also be controlled locally at the converter as well as remotely, and even over a network. Still further, this selection may consider the performance or operation of a single inverter as well as multiple inverters and systems of multiple inverters. Embodiments may also include and consider various DC power sources. For example, in embodiments where several photovoltaic module are each connected to a single microinverter, the PV modules/microinverter pairs may be managed or controlled individually and in a set or subset. In so doing, an overall system capacitance or overall system inductance may be managed and controlled in addition to or rather than the individual capacitance or individual inductance of a single PV module/microinverter pair.

In embodiments, power bus voltage control may be implemented through control loops that serve to manage power input from a generating source and waveform output to a power source. The generating source may be various DC sources, such as photovoltaic cells ("PV cells" or "solar cells"), fuel cells, wind turbines, water turbines, and batteries. The power source may vary as well, including the AC public power grid and other available AC power sources. Embodiments may exhibit power management and bus control at various operational times, including when a converter is initially coupled to a voltage source, during session startup, during operational steady state, and at other times as well.

As to power management, embodiments may account for a fundamental electrical property of a single-phase AC power system, which is that energy flow includes both an average power portion that delivers useful energy from the energy source to the load and a double-frequency portion that flows back and forth between the load and the source:

$$p(t) = V_{rms} * I_{rms} * (\cos\phi - \cos(2*\omega t + \phi)) \quad (1.3.1)$$

$$\text{where } v(t) = 2^{1/2} * (V_{rms} * \sin(\omega t)) \quad (1.3.2)$$

$$i(t) = 2^{1/2} * (I_{rms} * \sin(\omega t + \phi)) \quad (1.3.3)$$

$$\text{and } p = v * i \quad (1.3.4)$$

In applications involving inverters, the double-frequency portion may represent the undesirable ripple power mentioned above. This ripple power, if reflected back into the DC power source in a significant amount, may compromise performance of the DC power source.

The effect ripple has on performance may be particularly relevant for photovoltaic cell power sources whose delivered power may vary in magnitude over time due to temporal variations in operating conditions, e.g., changes in sunlight intensity, angle of incidence of sunlight, ambient temperature, etc. Thus, photovoltaic cells have an operating point at which the values of the current and voltage of the cell can result in an ideal or "maximum" power output. This "maximum power point" ("MPP") is, thus, a function of environmental variables, including light intensity and temperature. Consequently, inverter embodiments may, therefore, include some form of maximum powerpoint tracking ("MPPT") as a mechanism of identifying and tracking the maximum power point ("MPP") and adjusting the inverter to exploit the full power capacity of the cell at the MPP. Exemplary MPPT topologies and methodologies may include those disclosed in U.S. Pat. No. 5,801,519.

Extracting maximum power from a photovoltaic cell often requires that the cell operate continuously at its MPP. As such, fluctuations in power demand, caused, for example, by the double-frequency ripple power being reflected back into the cell, may compromise the ability of an inverter to deliver the cell's maximum power. In embodiments, bus voltage variations may be monitored and managed on an ongoing or real-time basis to increase operation at the MPP. Embodiments, may, therefore, include a layer of control to account for these bus voltage variations and may establish or use practical voltage minimums or other ranges to improve power conversion efficiency. This control may include active management of the bus voltage and modification of phase shift of the output current waveform. Other methodologies or techniques may be used as well.

As noted above and further below, the power factor of a converter embodiment may be adjusted through management or manipulation of the phase angle of the output current. This adjustment may consider inverter power, grid voltage, and a phase shift authorization command to determine a commanded bus voltage and a desired phase angle shift. This commanded bus voltage may be offset by a safety factor to accommodate tolerances, circuit imprecision, or for other reasons as well.

In embodiments, a boundary of the commanded bus voltage may be determined by considering the normalized bus capacitance and bus phase angle. This boundary may be considered when determining commanded phase angle and power settings. A look-up table with various power values, grid voltages, and phase shift authorization settings for the circuit being managed, and for other circuits as well, may also be used. These look up tables may include settings or commanded values for various operating powers or other conditions of the circuit. These look up tables may be employed to reduce processor delay or consumption when determining a desired commanded voltage, current or other value. The commands may be selected during operation to modify or maintain performance. Other methodologies for providing a commanded bus voltage and a commanded phase angle may be used as well.

The phase settings for minimum power loss may vary with bus voltage, capacitance, and apparent power. For example, minimum power losses may be realized with phase set at points other than 0° and ±90°. Thus, in embodiments, phase shift and bus voltage may be managed and controlled to provide a preferred or optimized power output while also, in certain circumstances, providing a capacitive load to an overly inductive power grid. In other words, an optimum setting between 0 degrees, −90 degrees (pure reactive power) and 90° (pure inductive power) may be identified to minimize power losses in the inverter and simultaneously provide some potentially useful reactive power to the grid.

As noted, the desired or commanded phase shift may also be controlled remotely to adjust the reactive power offered by the inverter to the mains power grid. Still further, embodiments may also be provided wherein power cycles are occasionally or periodically paused so that power is not continuously dispensed into the power grid. This sporadic power dispensing or "jog" mode may be further controlled with commanded phase shifts and bus voltages that serve to manage the average power bus voltage and the reactive power presented to the power grid.

Still further, in embodiments, an optimum set point, which supports inverter power efficiency and simultaneous reactive power, may be identified and used for different average bus voltages of the inverter. These set points may also be stored in the look-up table, calculated on an as-needed basis, or identified with curve fitting techniques, when determining a commanded bus voltage or a commanded phase shift.

FIG. 1 shows an inverter 106 as may be employed in embodiments. In FIG. 1 the inverter 106 of power conversion system 100 is shown to be electrically connected to the DC source 104 and AC grid 102. The inverter 106 is configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., f=ω/2π=50 Hz or 60 Hz).

The inverter 106 may include a plurality of circuits to facilitate the conversion of DC power to AC power. These circuits may be embodied in those described herein as well as in other designs and topologies. For example, possible additional circuits and configurations may be found in U.S. patent application Ser. No. 12/563,499.

In embodiments, the inverter 106 may include one or more processing circuits 108 and one or more memory circuits 110. The processing circuit 108 may be embodied as any type of processor and associated circuitry configured to perform one or more of the processes or functions described herein. For example, the processing circuit 108 may be embodied as or otherwise include a single or multi-core processor, an application specific integrated circuit, a collection of logic devices, or other circuits. Likewise, the memory circuitry 110 may be embodied as various memory devices, e.g., read-only memory devices and/or random access memory devices. In embodiments, the memory circuitry 110 may be embodied as or otherwise include dynamic random access memory devices (DRAM), synchronous dynamic random access memory devices (SDRAM), double-data rate dynamic random access memory devices (DDR SDRAM), and/or other volatile or non-volatile memory devices. The memory circuits 110 may have stored therein a plurality of instructions for execution by the processing circuitry 108. When executed, the processing circuitry may be configured to control particular functions of the inverter, provide certain command signals, determine certain circuit operating parameters, and manage or query the look up tables, each as discussed in more detail herein.

Figure 2:
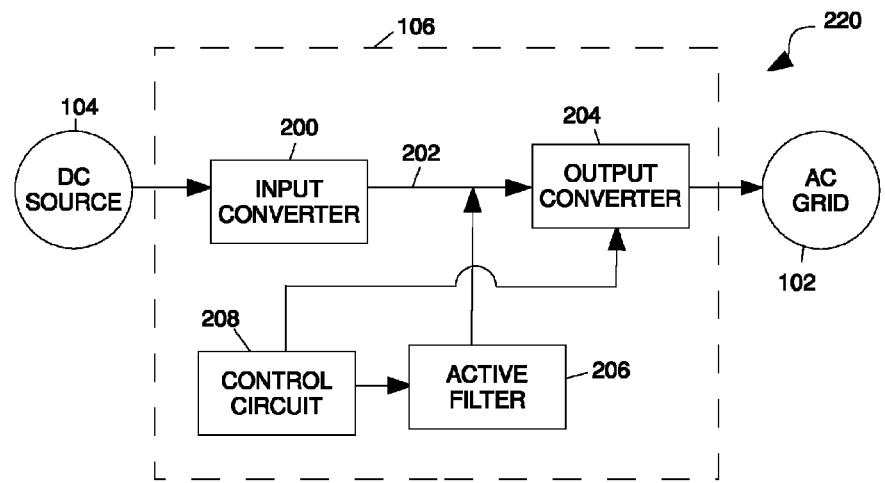
FIG. 2 shows general circuit topology of a power conversion system as may be employed in accord with embodiments of the invention.

FIG. 2 shows additional components as may be employed in embodiments. The inverter 106 of the power converter system 220 is shown with an input converter 200 electrically coupled to a power bus 202, and an output converter 204 electrically coupled to the power bus 202. FIG. 2 also shows the inverter 106 with a control circuit 208 electrically coupled to the input converter 200, and the output converter 204. This control circuit may be configured to control operations thereof. As discussed in more detail below, the power bus 202 may be embodied as a DC bus or an AC bus. Accordingly, the input converter 200 may be embodied as a DC-to-DC converter or a DC-to-AC converter and the output converter may be embodied as a DC-to-AC converter or an AC-to-DC converter. Numerous converter circuit topologies may be used in embodiments. These converter circuit topologies include a buck-boost converter circuit topology, a flyback converter circuit topology, SEPIC converter circuit topology, an half-bridge converter circuit topology, a full-bridge converter circuit topology, and an LLC series converter circuit topology. Still more circuit topologies may be used as well.

In use the inverter 106 may be configured to be electrically coupled to the DC source 104 to receive a DC waveform therefrom. The inverter 106 may convert the DC waveform to a bus waveform, which may be a DC waveform or an AC waveform. Similarly, the output converter may be configured to be electrically coupled to the AC grid 102 and convert the bus waveform (i.e., either a DC waveform or an AC waveform) to the output AC waveform at the grid frequency.

In embodiments, the single-phase power output of the inverter 106 includes an average component and a time-varying component due to variations in the DC source 102 and/or demands of the AC grid 102. The time varying component may have a frequency substantially equal to twice the output AC waveform (i.e., the grid frequency). Without filtering, such double-frequency power ripple will be supplied by the DC source 102 (i.e., the double frequency ripple power propagates back and forth between the AC grid 102 and the DC source 102). Such demands on the DC source 102 can result in failure or lower performance of the DC source 102 and inverter 106.

The control circuit 208 may be electrically coupled to the input converter 200 and configured to control operation of the input converter 200. This operation may function to convert the input DC waveform from the DC source 104 to a bus waveform at the power bus 202. In embodiments, the control circuit 208 may control the operation of the input converter based on a maximum power point tracking ("MPPT") algorithm or methodology. For example, the control circuit 208 may include an MPPT control circuit configured to execute an MPPT algorithm such as the MPPT algorithm described in U.S. Patent Publication No. 2008/018338, entitled "Ripple Correlation Control Based on Limited Sampling" by Jonathan W. Kimball et al. To do so, the control circuit 208 may provide a plurality of control signals to various circuits of the input converter 200 as, for example, described in more detail below.

The control circuit 208 may also be electrically coupled to the output converter 204 and may be configured to control operation of the output converter 204 to convert the bus waveform to the output AC waveform such that it is suitable for delivery to the AC grid 102. In embodiments the control circuit 208 may be configured to use a pulse width modulation algorithm to control the output converter 204 such that the output AC waveform is pulse width modulated. To do so the control circuit 208 may provide a plurality of control signals to various circuits of the output converter 204 as described, for example, in more detail below.

Additionally, the control circuit 208 may be electrically coupled to the active filter 206 and configured to control the active filter to reduce the double-frequency power ripple on the power bus 202. In some embodiments, the active filter 206 may be embodied as a current-controlled switching converter. In such embodiments the active filter 206 may include an inverter circuit and an energy storage device or circuit. In such embodiments, the control circuit 208 may be configured to control the inverter circuit of the active filter 206, to control a time varying current of the energy storage circuit, and to generate an active filter AC waveform at the energy storage device in order to thereby supply energy to or absorb energy from the power bus 202.

Figure 3:
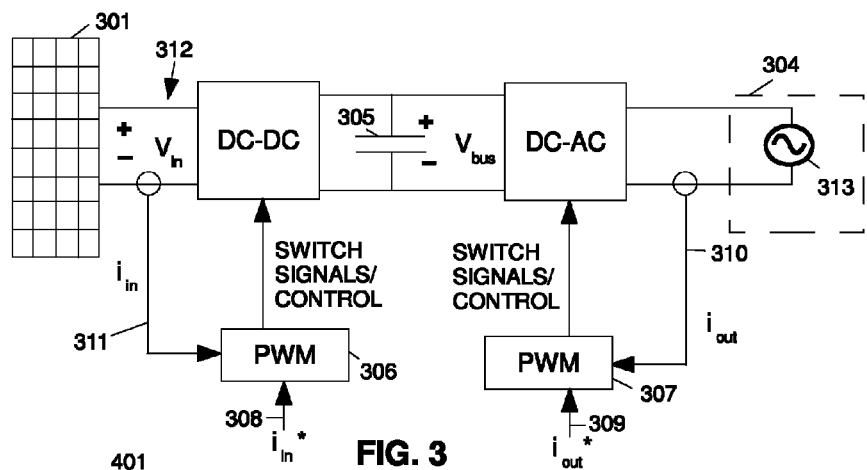
FIG. 3 shows a two-stage inverter positioned between a DC power source and the public power grid as may be employed in accord with embodiments of the invention.

Inverter embodiments can be built from numerous different power converter topologies. FIG. 3 shows a DC-DC stage and a DC-AC stage inverter topology. Labeled in FIG. 3 are the photovoltaic modules 301, the DC-DC stage 302, the DC bus capacitor 305, the DC-AC stage 303, the public power grid 304, pulse width modulation control 306, pulse-width modulation control 307, monitored current line 311, monitored current line 310, commanded current 308, commanded current 309, measured source voltage 312, and grid waveform 313.

The PV modules 301 may generate a DC voltage 312 in the range of 18V to 36V, and may provide this voltage to the DC-DC stage 302. The DC-DC stage may use various topologies to step up and filter the DC voltage before making it available to the capacitor 305. In embodiments, for example, a full-bridge isolated boost may be used for the DC-DC stage.

A PWM signal may be generated to control the topology of the DC-DC stage. This PWM signal may be generated by monitoring the PV current using monitored current line 311 and comparing it to commanded current 308. Adjustments may be made such that the PWM signal controls the DC-DC stage to produce a monitored current at 311 consistent with the commanded current 308. As explained herein, the commanded current 308 may be set by a Maximum Power Point Tracker and Bus Voltage Command Calculator that together serve to optimize the power output of the PV module 301. The commanded current may be set for other targets as well.

Still further, the DC-DC stage may also serve other functions. These may include: a) increasing the varying voltage from the PV module 301 to the bus voltage; b) ensuring that during steady-state conditions a constant current flows from the PV module 301; c) providing isolation between the PV module 301 and an AC single-phase power source; d) providing maximum power point tracking of the solar module; and e) serving to conform the inverter to regulatory requirements of the power grid.

The DC-AC stage 303 may be controlled by signals from the PWM module 307. This DC-AC stage control may also serve to control the voltage across the DC-link capacitor 305. As with the DC-DC stage, the DC-AC stage may have various topologies and may include not only a power conversion circuit but filtering or other circuits as well. In embodiments, for example, a soft-switched four-quadrant converter may be used for the DC-AC stage. The DC-AC stage may function to convert DC voltage available from the DC bus capacitor 305 into an AC waveform usable on the power grid 304. In embodiments, this waveform may not only match the frequency and voltage of the grid waveform 313, but may also provide a net capacitance that may be further beneficial to the power grid. Still further, the PWM module 307 may compare the monitored current 310 with the commanded current 309 in order to send switch signals to the DC-AC stage that can serve to produce a waveform consistent with the power grid waveform 313.

As discussed herein this targeted waveform may not only closely mimic the power grid AC frequency and voltage, the target AC waveform may also have an effective commanded phase angle $\phi$ that serves to improve the availability of the power generated by the PV module 301 for the grid 304. This effective commanded phase angle $\phi$ may be determined through curve matching, table look up, and through other methodologies as well.

In preferred embodiments, the DC-AC stage and the DC-DC stage may function under PWM commands that provide for switching efficiencies in the range of 98%-100%. Embodiments may also have switching efficiencies that fall in other ranges as well. Thus, like the DC-DC stage, the DC-AC stage may also serve various functions. These may include: a) producing a controllable, sinusoidal line current into the power grid; b) regulating the DC bus voltage, which may nominally fall around 360V to 450V in certain embodiments, but may have other ranges as well; and c) serving to conform the inverter to regulatory requirements of the power grid.

Figure 4:
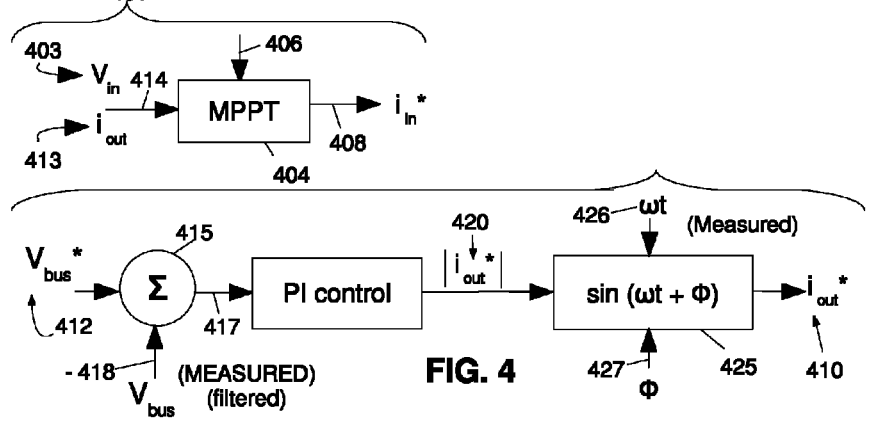
FIG. 4 shows control logic as may be employed in accord with embodiments of the invention.

FIG. 4 shows logical topologies as may be employed by embodiments when generating commanded currents. Logic that may be employed for generating a commanded current 408, which may serve to optimize the power generated from a PV module, is shown at 401. Logic that may be employed for generating a commanded current 410, which may serve to provide a preferred inverter DC bus voltage, is shown at 402.

As shown in Logic 401, an input voltage 403 and a current correction 403 may be received by a Maximum Power Point Tracker 406, which may take these inputs, along with other received inputs 404, to output a commanded current 408. This commanded current 408 may be used by a switch controller to manage the switching frequency or other variables that, in turn, serve to control the amount of current flowing from the DC source. The commanded current 408 may be selected such that a DC power source may provide power in a preferred, targeted, or optimized condition. Thus, through the use of the MPPT, or similar circuitry, embodiments may manage the current from a DC power source so as to optimize the amount of power from the DC source.

As shown by the Logic 402, measured bus voltage 413 may be subtracted at 415 from the commanded bus voltage 413. This measured bus voltage 413 may be filtered ahead of the summing to remove 120 Hz ripple noise. The calculated signal 417 may then be modified by a proportional integral control to reduce or eliminate errors and to output an absolute value of current output. This absolute value of current 420 may be input to a bus voltage controller 425 along with the measured frequency $\omega$ 426 and a selected phase shift $\phi$ 427 to output a commanded current $i_{out}^*$ 410. This commanded current may be determined by calculating the sine of the frequency of the grid at that point in time plus the addition of the selected phase shift.

$$\sin(\omega t + \phi) \tag{1.4}$$

Figure 5:
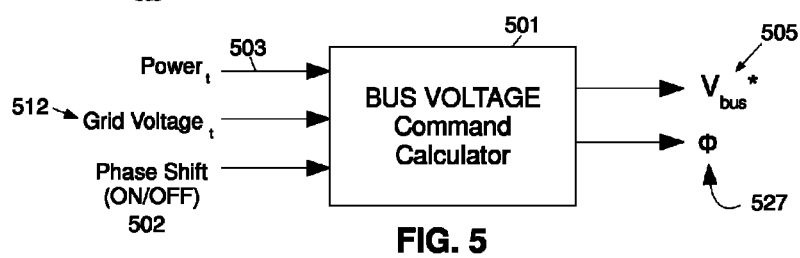
FIG. 5 shows a Bus Voltage Command Calculator as may be employed in accord with embodiments of the invention.

FIG. 5 shows a Bus Voltage Command Calculator (BVCC) as may be employed in embodiments. A BVCC may be implemented through various configurations and topologies. In embodiments a BVCC may serve to provide a commanded bus voltage $v_{bus}^*$ and a commanded phase angle $\phi^*$ that may serve to control the bus voltage of the DC link and the phase angle of the produced AC waveform. As seen in FIG. 5, the BVCC may receive inputs that include the power being produced by a DC source at a given time, the voltage of the public power grid at a given time, and whether or not the produced AC waveform may be varied to increase or decrease its net capacitance or inductance. This phase shift instruction is shown as a toggle on or off commanded input 502.

In embodiments, considering the DC source power 503 at that time, the grid voltage 512 at that time, and whether or not phase shift is requested, the BVCC 501 may provide a commanded bus voltage 505 and a commanded preferred phase shift 527. The commanded bus voltage may be set to a set point that optimizes the efficiency or power output of the converter. The optimum phase angle may vary with the power output at the time for a certain circuit topology. Thus, in embodiments, both the MPPT and the BVCC may vary to provide increased power outputs for a specific circuit topology at a certain DC source power output and a certain line voltage power waveform.

In embodiments, the set point may also include a safety factor to accommodate tolerances, lack of perfect switching circuitry, and other imperfections as well. Thus, in practice, a safety factor may be added to the determined ideal bus voltage so as to provide a preferred appropriate margin for sensors and the less than ideal capabilities of embodying circuits. In one example, the safety factor may represent a 5% increase to the ideal bus voltage or the addition of a fixed voltage, like 10 V, to the ideal bus voltage. Other accommodations and adjustments may also be made.

The BVVC may consider the capacitance of the DC-link capacitor, the frequency of the power grid, a phase shift at that time, the instantaneous power from the DC source and a bus voltage factor $K_F$. In embodiments the phase shift $\phi$ may be the phase shift of the current with respect to the voltage. The ideal bus voltage may be determined to be:

$$v_{bus,ideal} = \sqrt{\frac{S}{\omega C}\sin(2\omega t + \phi) + K_F} \quad (1.5)$$

Where S is apparent power of the power grid, C is the DC link capacitance, and $K_F$ is a pseudo constant bus voltage factor. From this ideal voltage determination, the commanded voltage 505 may be $v_{bus,\ ideal}$ plus a factor of safety. S may be determined using the peak voltages $V_p$ and currents $I_p$ of the AC power grid and may be represented as follows:

$$S = \frac{V_p I_p}{2} \quad (1.6)$$

Capacitance C, $2\pi f$, and measured phase shift $\phi$ may also be directly or indirectly considered when determining the $v_{bus,\ ideal}$. In embodiments, a normalized capacitance may be determined and this normalized capacitance may be considered in conjuction with the sine of the phase shift of current with respect to voltage and peak voltage to determine the pseudo constant bus voltage factor $K_F$. In embodiments, the following computations may be made when determining the voltage factor $K_F$. Where S is the apparent power and $V_p$ and $I_p$ are the peak AC voltage and current, respectively.

First, a normalized capacitance can be defined as:

$$C_n = \frac{\omega C V_p^2}{2S} \quad (1.7)$$

From this normalized capacitance, an intermediate voltage factor $K_{Fn}$, and the final voltage factor may be determined.

$$K_{Fn} = \frac{1}{2}\left[1 + \sqrt{1 + \frac{\sin(2\phi)}{C_n} + \frac{1}{C_n^2}}\right] \quad (0.1)$$

$$K_F = V_p^2 K_{Fn}$$

Given the complexity of these equations and the cost and power burdens solving them impose on signal processors, an approximation for reasonable values of circuit ripple may also be used in embodiments. In embodiments, this approximation may be defined as the square root of the intermediate voltage factor $K_{Fn}$:

$$\bar{v}_{bus,ideal} \approx \sqrt{K_F} \quad (1.9)$$

That is the average voltage may be understood to be dominated by one term.

In embodiments the solution to the equation may also be obtained using curve fitting given the complexity of $K_F$. A quadratic curve fitting methodology may be used. For example, $v_{bus,\ ideal}$ may be determined using the following curve fitting equation:

$$\bar{v}_{bus,ideal} \approx c_0 + c_1 I_p + c_2 I_p^2 \quad (1.10)$$

In embodiments, the constants $c_0$, $c_1$, $c_2$ may be set from the curve fit. Of course, a look-up table for $v_{bus,\ ideal}$ may also be used as can other mathematical approximations.

As noted, the determination of the $K_F$ factor by the BVCC may be simplified or streamlined through the use of curve fitting or through the use of a look up table or both. In so doing circuit topology may be simplified and processor burdens may be reduced. Also, the phase angle may be set to negative or positive in embodiments to account for leading or lagging power factors. In preferred embodiments the phase angle may be positive and set to specified degrees or ranges of degrees.

Figure 6:
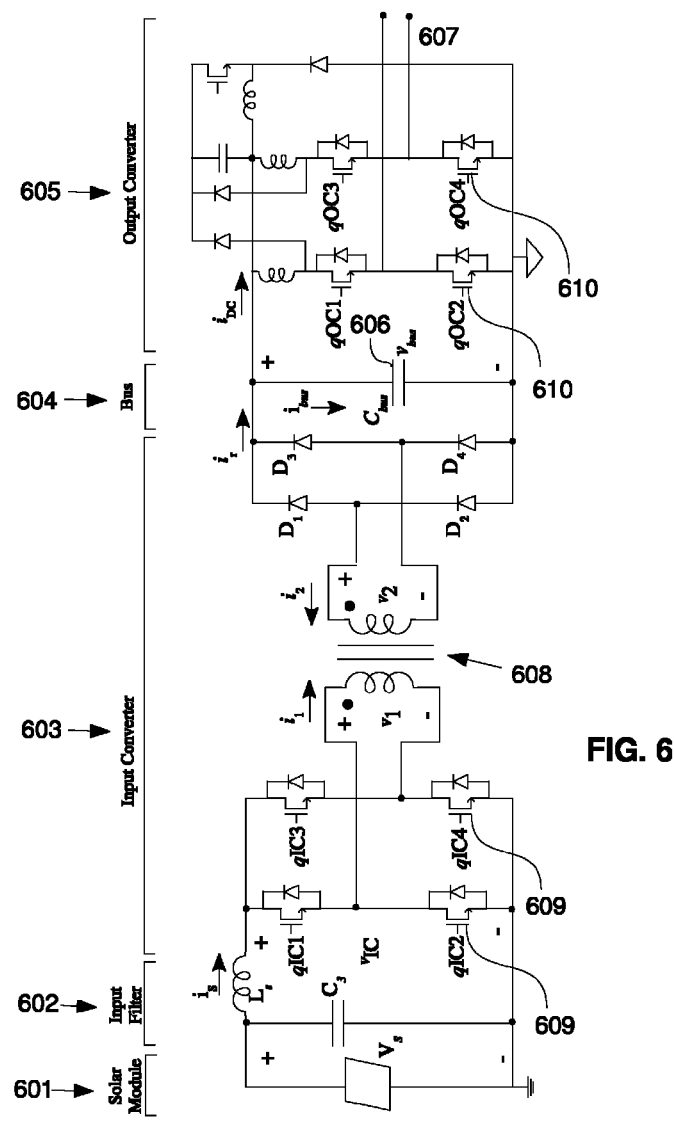
FIG. 6 shows circuit topology of an inverter as may be employed in accord with embodiments of the invention.

FIG. 6 provides the general circuit topology of an inverter having a DC bus link as may be monitored and controlled by the MPPT and the BVCC of FIG. 4 and FIG. 5. As can be seen, the solar module 601 may be coupled to a step up DC-DC converter through an LC filter that may serve to protect the solar module 601 from transients. The input converter 603 may step up the voltage using a transformer 608 and then rectify this AC waveform for use by the output converter. The DC link capacitor 606 is positioned, in parallel, between the converter 603 and the converter 605. The output from the converter 605 may be to the public power grid at 607. The DC link capacitor may be a thin film capacitor in embodiments as thin film capacitors may be preferred because of the little degradation over time they can offer.

A PWM controller may be used to control the switches of both converters. The PWM signals driving these switches may be modified and manipulated as described herein such that the power generated by the solar module 601 is at a maximum power setting and such that the voltage of the DC-link capacitor 606 is optimized. In this embodiment, as well as in others, the power grid may have an RMS voltage of 240-VAC with a frequency of 60-Hz, which represents a common residential application.

Here and in other embodiments the capacitance of the bus may be sized relative to the power on the bus. For example, a target capacitance upper design threshold may be 200 nanofarads/watt. Following this exemplary range, a 250-watt inverter may include a 23.4 uF capacitor, which provides approximately 90 nF/watt of power. Thus, in embodiments, the bus capacitance size may be sized relative to power rating. In embodiments, the bus capacitance may also be sized to targeted power minimums with an additional increase of a selected percentage as a factor of safety. Also, it may be preferred to select capacitive values that are sized such that film capacitors rather than electrolytic capacitors may be employed. Nevertheless, embodiments may employ various types of capacitors and various size capacitors in addition to the types and sizes set out herein.

In photovoltaic power system embodiments an inverter may be associated with one or more solar cell panels. In some systems, strings of solar cell panels may deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels may be smaller, with relatively lower voltage (e.g., 25 V). Inverters may be placed in close proximity to the associated solar cell panel to increase the conversion efficiency of the overall system.

In embodiments, double-frequency ripple power may be managed by storing and delivering energy at twice the AC frequency. To do so a passive or active filter may be used to manage the double-frequency ripple power on the input side of the inverter. In passive filtering arrangements, a large capacitance may be used because the capacitive device preferably supports the DC bus voltage without imposing significant voltage ripple on the DC bus. Still further, in active filter arrangements a relatively smaller capacitance may be used because the capacitive device need not support the DC bus voltage. Because the active filter "isolates" the internal capacitor from the DC bus, the voltage variation across the internal capacitor can be relatively large and the value of the capacitor may be made relatively small.

Figure 7:
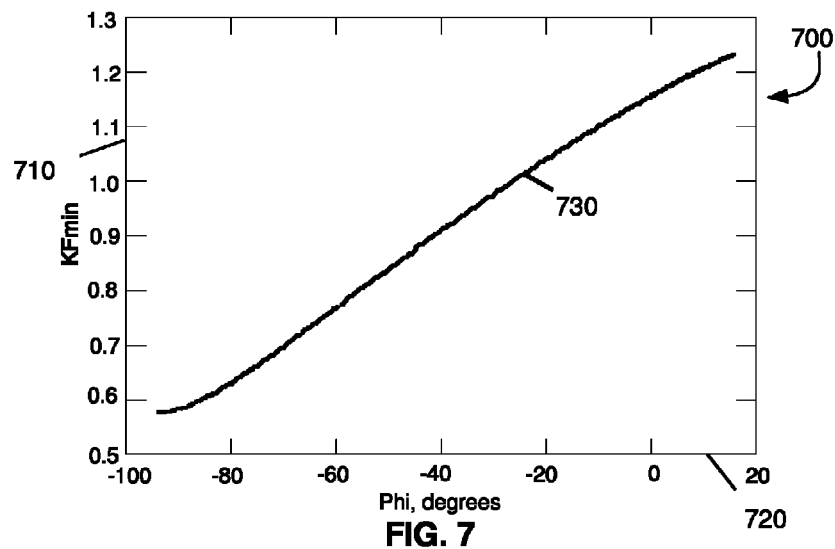
FIG. 7 shows a graph of phase angle versus a computed coefficient as may be considered in accord with embodiments of the invention.

FIG. 7 is provided to further describe factors that may be considered when setting boundaries for the $v_{bus,\ ideal}$ command signal. It is noteworthy in FIG. 7 that the displayed optimal phase shift is negative and is predicated on the assumption that positive current flows out of the inverter. Thus, evaluating an inverter as a load to the grid, current in these situations is negated so that positive power flows into the inverter. With this flow comes real and apparent power drawn by the inverter. The apparent power referenced into the inverter is $$S = VI^* = -V_{rms}I_{rms}\cos(\phi) + jV_{rms}I_{rms}\sin(\phi) \quad (1.11)$$

If the phase shift is negative, this yields a negative imaginary part, e.g.

$$-jV_{rms}I_{rms}\frac{\sqrt{2}}{2}$$

for −45 degrees, which is consistent with the behavior of a capacitor placed across the power grid voltage. Capacitors positioned in this orientation consume reactive power, i.e., have a negative imaginary component to the apparent power. However, by moving away from unity power factor the rms current must increase to deliver the same amount of average power, as reflected by the $\cos(\phi)$ term. The increased RMS current will cause loss in power semiconductors and other resistive/lossy components in the output stage of the inverter. Also worthy of note is that the RMS current can act inversely proportional to $\cos(\phi)$ in order to maintain constant power and that resistive losses can be proportional to the square of RMS current.

In embodiments, it may be preferable to minimize the normalized losses of an inverter providing AC power to the public power grid. These losses may be crudely modeled using the sum of three components:

$$P_{loss} = k_1\sqrt{K_F} + k_2 K_F + k_3\frac{1}{\cos(\phi)^2} \quad (1.12)$$

Other losses may scale with the peak of current and can also be accounted for. In the foregoing equation, for example, the k's may be considered to be constants that account for the relative proportion of losses stemming from the bus voltage and increased RMS current. The first term may be considered to scale with bus voltage (like conventional switching losses), the second term may be considered to scale with the square of bus voltage (like switching losses due to parallel switch capacitance) and the last term may be considered to scale with the inverse of $\cos(\phi)^2$, thus, the last term models the effect of increased resistive losses.

In embodiments, the foregoing loss model equation may be modified by taking into account more subtle losses, variation with temperature, and other factors having similar order of magnitude effect. In preferred embodiments, rather than using mathematical modeling, the losses versus phase shift and changing bus voltage may preferably be determined empirically through experimentation with the circuit inverter topology at issue.

FIG. 7 shows a graphical representation of exemplary phase angles (in degrees) 720, without concern for power factor, for various $K_{F^n}$ factors 710 when the normalized capacitance of the DC link is set to 23.4 microfarads. As can be seen in FIG. 7, bus voltage shrinks as the phase shift approaches −90°. Thus, the smallest possible bus voltage may be obtained when phase shift is set to −90°. However, as explained herein, the unity factor of the inverter may also be considered, and when it is, the optimum phase angle for minimizing the capacitive load and required size may not equal the optimum phase angle and bus voltage for developing the most useable power from an inverter.

Embodiments may size the LC circuits such that their natural resonant frequency is percentages different than the mains grid frequency. Thus, LC resonant oscillating frequencies near or around 50 Hz and 60 Hz may be avoided when sizing LC circuits of the systems embodying the invention.

Figure 8:
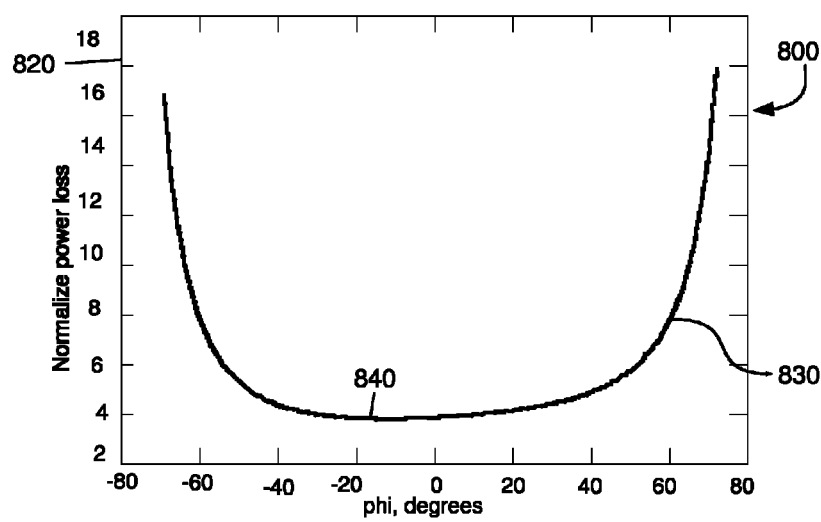
FIG. 8 shows a graph of phase angle versus normalized power loss as may be considered in accord with embodiments of the invention.

FIG. 8 shows the empirical results of test performed on an exemplary circuit topology. FIG. 8 reinforces the premise that in embodiments phase shift and bus voltage together can be varied to produce an optimal solution while at the same time presenting a capacitive load to an overly inductive grid.

In FIG. 8 the three constants ($k_1$, $k_2$, and $k_3$) were approximated to be equal to one, and a normalized power loss versus phase shift is plotted. As can be seen, the minimum loss here does not occur at −90 degrees, but more near about −14 degrees 840. For different values of k and other variations, the optimum phase angle for the minimum loss point should differ. Consistent with the above discussion, the curve 830 of FIG. 8 may be obtained experimentally for various circuit topologies by adjusting phase shift and setting the average bus voltage accordingly.

Figure 9:
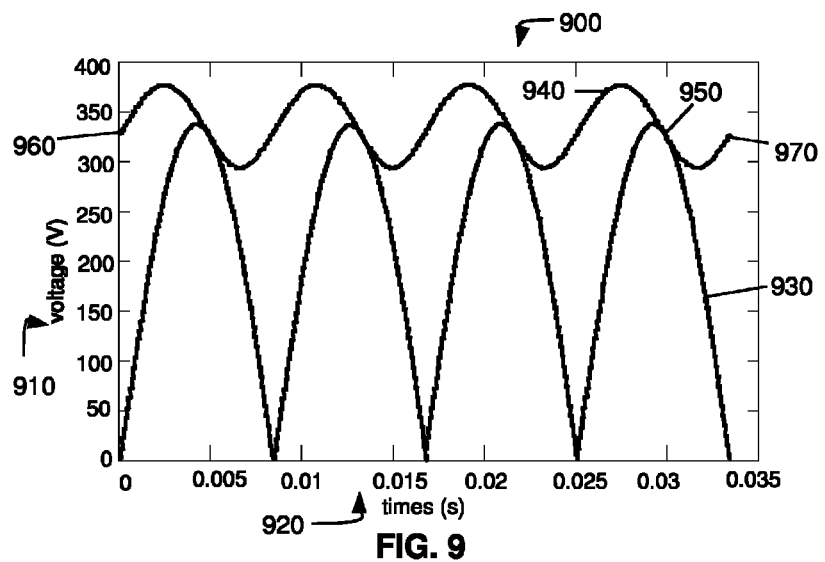
FIG. 9 shows a graph of voltage versus time as may be considered in accord with embodiments of the invention.
Figure 10:
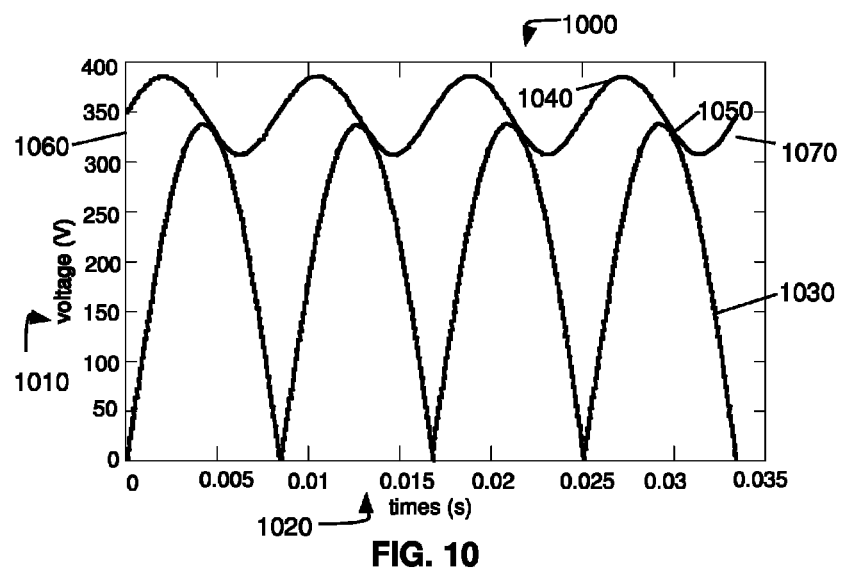
FIG. 10 shows a graph of voltage versus time as may be considered in accord with embodiments of the invention.

FIGS. 9 and 10 show how boundaries may be established to inhibit the likelihood that bus voltages will be commanded into voltage ranges below concurrent operating ranges of the capacitor or other circuit topology. FIG. 9 shows the absolute value of grid voltage and the bus voltage for a −14-degree phase shift, 240(rms) VAC, 60-Hz line voltage, bus capacitance of 23.9 microfarads, and 240 W AC output power, which are conditions typical of full-power output of Solar-Bridge brand microinverters.

Both figures show an ideal case where the bus voltage just touches the absolute value of grid voltage. As can be seen in FIG. 9 the average bus voltage is 336 V and the inverter is consuming −59.8 VARs (reactive power). Comparatively, FIG. 10 shows the same conditions but with zero phase shift. As can be seen, the average bus voltage rises to 343 V and the microinverter is consuming 0 VARs. Thus, switching losses likely will be reduced in this case. In both examples, the actual command bus voltage may be preferably increased by a relatively small amount to allow some margin of safety and to accommodate real circuit imperfections.

Figure 11:
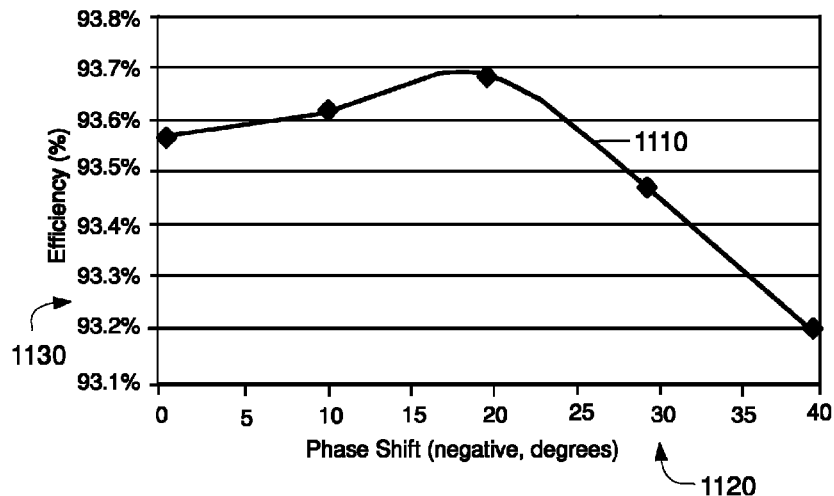
FIG. 11 shows a graph of phase shift angle versus efficiency as may be considered in accord with embodiments of the invention.

FIG. 11 shows empirical results of simulations conducted in accord with embodiments. The inverter topology was similar to that shown in FIG. 6 and included standard H-bridge switching configurations with power MOSFETs. The bus voltage is shown modeled as an ideal voltage source programmed to have an average value and ripple consistent with the foregoing topology and was set 5% higher than the theoretical minimum to allow a safety margin for proper circuit operation. The bus capacitance was 23.4 microfarads and the line voltage was 240 Vrms. An ideal current source at 60 Hz, and representative of an inductor, was placed on the H-bridge and a pulse-width-modulated source programmed to produce a 60-Hz sine wave fundamental component triggered the gate drives for each power MOSFET in the simulation. Each gate drive was modeled as an ideal voltage source behind a 50-ohm resistance and the pulse width modulation was generated by comparing a carrier to a modulation signal. In this case, the carrier was a 25-kHz symmetrical triangle wave and the modulation signal was a sinusoidal 60-Hz component out of the H-bridge. A light load condition for a 225-watt inverter was simulated by setting the output power level to 22.5 W and the phase shift was varied from 0 to −40 degrees.

As can be seen, in FIG. 11, this empirical analysis provides that the efficiency peaks toward the center of the plot, at approximately 20°. In an actual circuit, further analysis may be conducted over a wider range of operating conditions with similar results to determine the optimum phase shift for a given power level. These results may then be used to populate a look-up table that can designate power levels and phase angles for various operating conditions.

Thus, in embodiments, hardware testing may be carried out to populate curves like those above. These curves may then be used to select phase shifts that serve to optimize power efficiency while simultaneously providing reactive power to the grid. Further modification and honing may be conducted using the formulas above, through direct solution as well as using curve-fit or look-up table solutions, to develop an optimum set point for a desired average bus voltage. This desired bus voltage may then be used as the commanded $V_{bus}^*$ provided to any of a number of available bus voltage controllers.

Figure 12:
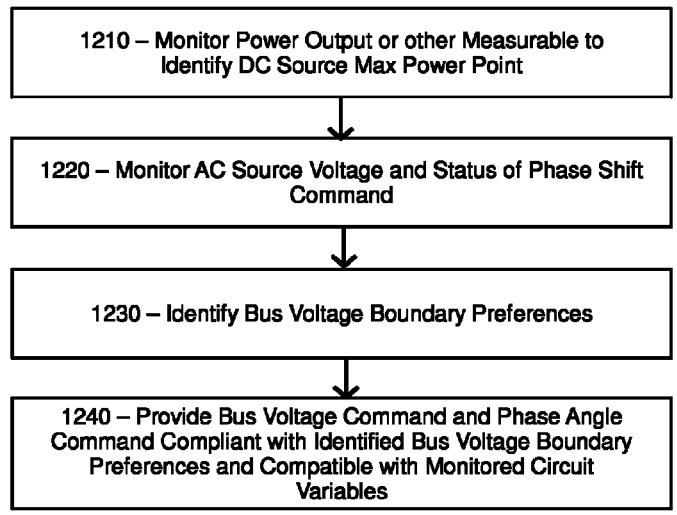
FIG. 12 shows features of a process for capacitive bus control as may be employed in accord with embodiments of the invention.

FIG. 12 shows a process as may also be employed in accord with embodiments. This process may include additional features, may be performed in various orders, may include fewer features, and may have other variations as well. As can be seen in FIG. 12, at 1210, the power output of a DC source may be monitored such that maximum power output settings may be identified. Likewise, AC source voltage may also be monitored as shown at 1220. Using these monitored or determined criteria a minimum bus voltage and phase angle may be determined. These power settings and phase angle settings may be used to control power control loops and phase angle control loops of an inverter.

FIG. 13 shows a process as may be employed in embodiments. As shown in FIGS. 13 at 1310 and 1320 normalized capacitance may be determined and used for determining the ideal bus voltage for the lowest practical bus voltage in embodiments. This normalized capacitance may be determined using formula 1.7 from above and the ideal bus voltage may be determined using any of the formulas 1.5 and 1.9-1.10 from above. As shown at 1330 and 1340, this determined ideal bus voltage may be adjusted by a safety factor and may be used to control phase angle and power output to maximize the efficiency of the inverter. In so doing, processes may be conducted that select low bus voltages that also serve to increase or maximize efficiencies. In other words, processes may use layers of control directed to both managing phase angle output and bus voltages in order to improve the inverter efficiencies. Still further, this joint or concurrent management of phase shift and bus voltage may also serve to present a capacitive load to an overly inductive grid or other power source.

Figure 14:
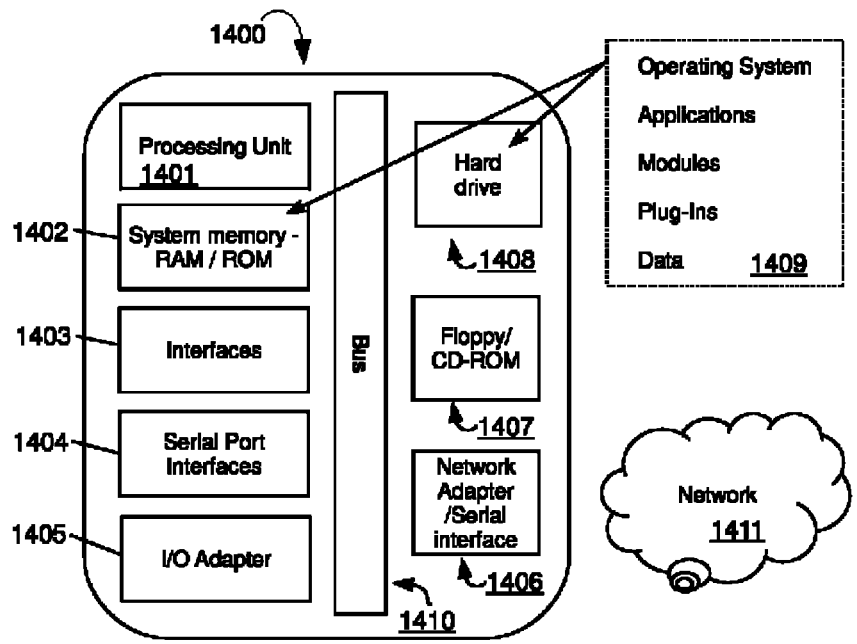
FIG. 14 shows a device as may be employed in accord with embodiments of the invention.

FIG. 14 shows a programmable computer as may be employed in embodiments. The programmable computer 1400 may include a processing unit 1401, system memory—RAM/ROM 1402, communication interfaces 1403, serial port interfaces 1404, I/O adapters 1405, a hard drive 1408, CD-ROM 1407, network adapter 1406, and a bus 1410 providing communication among and between these components. Other configurations may be used in embodiments as well. Instructions that embody the invention may be stored in the code 1409 that may be stored and loaded at run time. These instructions may include code to identify commanded bus voltages and commanded phase angles. These instructions may provide for other features as well.

Figure 15:
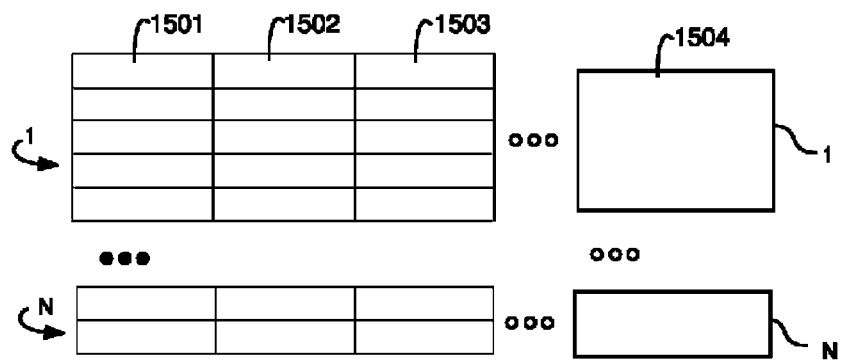
FIG. 15 shows a look-up table as may be employed for identifying preferred phase shifts or other commands for management of capacitive bus control as may be employed in accord with embodiments of the invention.

FIG. 15 provides a look up table 1500 as may be populated and queried in embodiments. As can be seen the table 1500 may contain numerous columns 1501-1504 and rows 1-N populated with phase settings and bus voltages for various power inputs and outputs. The table may be populated and used for a single inverter embodiments and may contain information for multiple inverter embodiments as well. Thus, in embodiments, the look up table may be populated for a single circuit topology, for multiple circuit topologies and for various operating conditions, including different grid cycle rates and different grid voltages. In so doing embodiments may provide flexibility of use for various working environments.

The table may be used in other ways as well. In multiple inverter embodiments, the table may be queried from remote locations and store information from remote locations as well. This remote storage and query may be used when power output of a plurality of solar panels or other DC power sources are being monitored or controlled or both. Thus, in embodiments, a remote controller may monitor power levels and grid characteristics in order to control several inverters such that overall systemic power is maintained, optimized, or otherwise controlled to a preferred response or output. For example, in embodiments, overall capacitance of a system including multiple inverters can be centrally monitored and individually managed to different individual capacitances and for a total system capacitance as well. This overall system management may provide for more flexibility in situations where DC source inputs may vary for individual inverters. This overall system management may be used for other reasons as well. Similarly, granularity of control, not plausible in single inverter embodiments, may also be plausible in multiple inverter systemic controls.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

The inverter, controllers, and methods described herein may be implemented as discrete circuits or in the form of software code and/or logical instructions that are processed by a microprocessor, digital processor, DSP or other means, or any combination thereof. The logical processes may run concurrently or sequentially with respect to each other or with respect to other processes, such as measurement processes and related calculations. Controllers may be implemented in mixed-signal circuitry; in circuitry comprising mixed-signal circuitry comprising a digital processor core; or in circuitry comprising a combination of mixed-signal circuitry and a separate digital signal processor. Such controllers may be implemented as an integrated circuit or a hybrid device. There may also be additional logical processes that may not be shown, such as, e.g., safety and protection mechanisms; timing and frequency generation mechanisms; and hardware and processes related to regulatory requirements. Pre-determined values, such as, e.g., the commanded values may be stored in read-only or re-programmable non-volatile memory such as memory circuitry 110 or other storage media. Communication circuitry may also be incorporated into the inverter as a means of downloading commanded values or other operating information to the inverter and/or for uploading inverter operating information to user equipment.

What is claimed is:

1. A method of bus control comprising:
   inputting measured power into a bus voltage command calculator of a dc link inverter;
   inputting measured grid voltage into a bus voltage command calculator of a dc link inverter;
   identifying the setting of a phase shift selection indicator;
   at the bus voltage command calculator, using the inputted measured power, the inputted measured grid voltage, and the setting of the phase shift selection indicator to determine a bus voltage command setting output from the bus voltage command calculator;
   using the bus voltage command setting output for setting the voltage of a capacitive bus positioned between a dc-dc boost converter and a dc-ac converter of a dc link inverter; and
   when the phase shift selection indicator is in a phase shift authorization setting, using the inputted measured power, the inputted measured grid voltage, and the status of the phase shift selection indicator to determine an output current phase angle command setting.

2. The method of claim 1 wherein the the phase shift selection status is changeable from an on position to an off position.

3. The method of claim 1
   wherein the dc-dc boost converter and the dc-ac converter are part of the same dc link inverter,
   the dc link inverter is electrically coupled between a power grid and a solar panel and
   wherein either the dc-dc converter or the dc-ac converter has circuit topologies including one or more of the following:
   a buck-boost converter circuit topology,
   a flyback converter circuit topology,
   SEPIC converter circuit topology,
   an half-bridge converter circuit topology,
   a full-bridge converter circuit topology, and
   an LLC series converter circuit topology.

4. The method of claim 1 further comprising:
   considering the capacitance of the capacitive bus and phase shift when determining the bus voltage command setting output, and selecting the capacitance size of the capacitive bus to have a rating of about 200 nanofarads or less for each anticipated watt of power on the bus.

5. The method of claim 1 further comprising:
   modifying the bus voltage command setting output by a safety factor, the safety factor serving to add separation between alternating bus voltages affected by the bus voltage command setting output and grid voltage values.

6. The method of the claim 1 further comprising:
receiving a phase shift selection indicator selection or change using a remote communication system in communication with the solar panel inverter.

7. The method of claim 1 further comprising:
modifying the bus voltage command setting output after the solar panel inverter has completed a jog mode cycle, where a number of cycles are dispensed to the power grid between anticipated pauses of power delivery to the power grid.

8. The method of claim 1 further considering apparent power, alternating voltage frequency, phase shift and a constant (KF) when determining the bus voltage command setting output.

9. The method of claim 1 wherein determining the bus voltage command setting output includes using a lookup table having bus voltage command setting outputs based upon measured power, measured grid voltage and phase shift selection indicator status, to determine the bus voltage command setting output.

10. The method of claim 8 wherein the constant (KF) is scaled by an apparent voltage and wherein the constant is set using normalized capacitance, phase angle, and peak voltage of the capacitive bus.

11. The method of the claim 1 wherein the determined bus voltage command setting output from the bus voltage command controller serves to reduce switching losses in the ac-dc converter and to promote a capacitive bias.

12. A power conversion system, the system comprising:
an input converter having switches, the switches controllable to convert electrical power from a first DC voltage to a second DC voltage;
an output converter having switches controllable to convert electrical power from a first waveform to a second waveform, the second waveform being an AC waveform;
a bus coupled in parallel to the input converter and the output converter;
an input controller configured to control switches of the input converter;
an output controller configured to control switches of the output converter; and
a bus voltage command calculator (BVCC),
the BVCC configured to generate a commanded bus voltage and a commanded preferred phase shift,
the commanded bus voltage and the commanded preferred phase shift selected and paired to modify the waveform output of the output converter.

13. The power conversion system of claim 12 wherein the BVCC further comprises:
a first input configured to receive a first signal, the first signal indicative of power provided from a DC source, and
a second input configured to receive a second signal, the second signal indicative of the power waveform of an AC power grid.

14. The power conversion system of claim 13
wherein the BVCC further comprises a third input configured to receive a third signal, the third signal indicative of commanded phase shift status, and
wherein the BVCC is configured to provide or not to provide the commanded preferred phase shift depending upon a received third signal indicative of commanded phase shift.

15. The power conversion system of claim 12,
wherein the BVCC is contained in a controller, the controller also having circuitry configured to determine a difference between commanded bus voltage and measured voltage of the bus, and to use that determined difference to generate a commanded current for controlling switches of the output converter.

16. The power conversion system of claim 12
wherein the input converter is a DC-DC stage converter, the output converter is a DC-AC stage converter, and the bus comprises a capacitor.

17. The power conversion system of claim 14
wherein the third input is in communication with a controller over a network, the network including a wide-area network and an internet protocol network.

18. The power conversion system of claim 13
wherein the input converter and the output converter are within a microinverter and wherein the commanded bus voltage and the commanded preferred phase shift are jointly selected and paired to conform the power output from the microinverter to an AC waveform on the public power grid and wherein the input converter includes a transformer.

19. The power conversion system of claim 13
wherein the input converter and the output converter are within a microinverter and
wherein the commanded bus voltage and the commanded preferred phase shift are jointly selected and paired to increase, for the public power grid, the useable power output from the microinverter.

20. An article of manufacture comprising:
a nontransient computer readable medium, the computer readable medium containing instructions, which when loaded and executed, configure a processor to perform the following process:
input a measured power into a bus voltage command calculator of a dc link inverter;
input a measured grid voltage into a bus voltage command calculator of a dc link inverter;
identify the setting of a phase shift selection indicator;
at a bus voltage command calculator, use the inputted measured power, the inputted measured grid voltage, and the setting of the phase shift selection indicator to determine a bus voltage command setting output from the bus voltage command calculator;
use the bus voltage command setting output for setting the voltage of a capacitive bus positioned between a dc-dc boost converter and a dc-ac converter of a dc link inverter; and
when the phase shift selection indicator is in a phase shift authorization setting, use the inputted measured power, the inputted measured grid voltage, and the status of the phase shift selection indicator to determine an output current phase angle command setting.

* * * * *